March 23, 1954     H. KREFT     2,673,275

ELECTRICALLY WELDING SHEET METAL CONTAINER

Filed Oct. 20, 1950     9 Sheets-Sheet 1

Inventor:
HELMUT KREFT
By Richardson, David and Nordon
his ATT'YS.

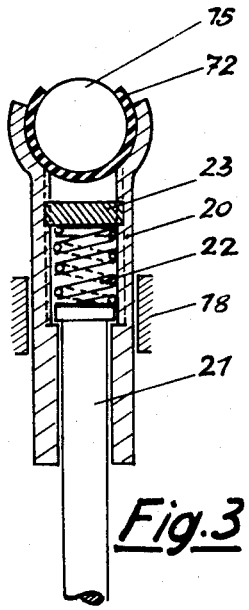
Fig.3
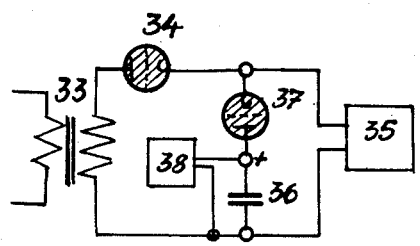
Fig.4
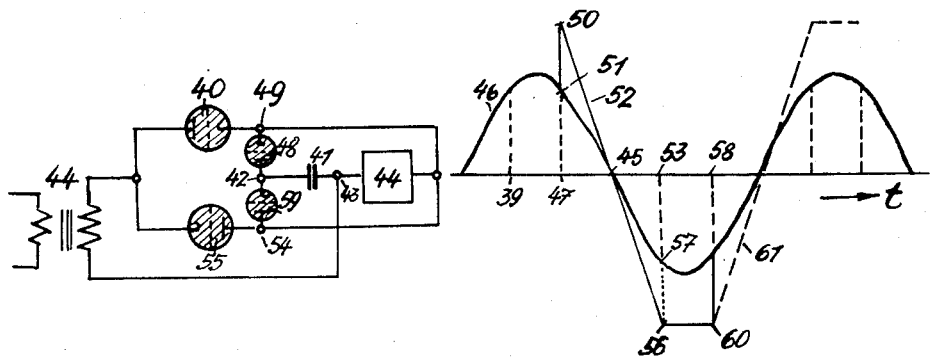
Fig.5
Fig.6

March 23, 1954 H. KREFT 2,673,275
ELECTRICALLY WELDING SHEET METAL CONTAINER
Filed Oct. 20, 1950 9 Sheets-Sheet 4

Inventor:
HELMUT KREFT
By Richardson, David and Nordon
his ATTYS.

March 23, 1954     H. KREFT     2,673,275

ELECTRICALLY WELDING SHEET METAL CONTAINER

Filed Oct. 20, 1950     9 Sheets-Sheet 5

Inventor:
HELMUT KREFT
By Richardson, David and Norton
his ATTYS.

March 23, 1954  H. KREFT  2,673,275
ELECTRICALLY WELDING SHEET METAL CONTAINER
Filed Oct. 20, 1950  9 Sheets-Sheet 6

Inventor:
HELMUT KREFT
By Richardson, Davis and Norton
his ATT'YS.

Inventor:
HELMUT KREFT

March 23, 1954     H. KREFT     2,673,275
ELECTRICALLY WELDING SHEET METAL CONTAINER
Filed Oct. 20, 1950     9 Sheets-Sheet 8

*Inventor:*
HELMUT KREFT

UNITED STATES PATENT OFFICE 2,673,275

ELECTRICALLY WELDING SHEET METAL CONTAINER

Helmut Kreft, Braunschweig, Germany

Application October 20, 1950, Serial No. 191,095

Claims priority, application Germany November 4, 1949

55 Claims. (Cl. 219—6)

The welding of lap seams in thin sheet metal e. g. in the production of sheet metal containers has hitherto been effected in the manner that a movable electrode in the form of a roller is caused to run over the seam to be welded, the current meanwhile passing through the seam. When the movable electrode has reached the end of the seam, it must be lifted and returned to the starting position.

This method of welding is accompanied by serious disadvantages particularly in the mass-production of bulk articles such as canning containers, preventing the output from being increased five to seven times above present figures.

The essential disadvantages of known welding methods are as follows:

Firstly, the rolling speed is relatively low and the welding time increased by the time necessary for returning the roller to the starting position.

Secondly, electrode wear and consumption is considerable, since "jumping" or chattering of the movable electrode causes sparking, leading to increased abrasion of the electrode.

Thirdly, owing to the relatively long welding time, a considerable quantity of heat is transmitted through the edges of the seam to the surface of the metal, causing undesirable heating of the electrodes, as well as tarnishing or scaling of the sheet metal. It is consequently impossible to weld coated sheet metal, e. g. tinplate, since the coating, e. g. the tin, melts under the action of the heat reflux. This also contaminates the surface of the moving electrodes and renders continuity of the welding process impracticable.

The invention, referring to a novel method of electric welding essentially proposes means of increasing the possible mass-production in unit time considerably over the output hitherto attained and further to enable the production of sheet-metal containers of all kinds such as canning containers, jam tins, canisters, etc., and other sheet metal containers of sheets coated with a second metal such as tinplate, by continuous seam welding.

The invention further refers to particular electrical arrangements and mechanical devices for performing the new method of welding.

The essential solution of the above problem consists according to the invention essentially in the use of a brief current pulse of high current intensity for the seam welding of sheet metal containers of all kinds of standard sheets, e. g. black or terne plates, or of sheet metal coated with a second metal, e. g. tin plates. Sparking and the accompanying disadvantages are reliably avoided in accordance with a further feature of the invention consisting in that current is supplied to the electrodes only while the latter are pressed together with sufficient force, and that the electrodes practically do not move relatively to each other during the welding process. Further features of the invention consist in that the electrodes are placed in contact in such manner, e. g. by a rectilinear motion, that the sheets to be welded, suitably lap-jointed, are pressed together by the electrodes, and that the current pulse is allowed to pass only after the electrodes have been pressed together with a sufficient force; directly or indirectly, e. g. depending on the contact pressure or on that of an interpolated spring element; the electrodes being removed from contact with each other only after fading of the current pulse, the welded container being thereupon removed, i. e. extruded.

The sheet-metal join to be welded, is thus pressed together throughout its whole length, by one or more pairs of electrodes, with a sufficient force, after which a sufficiently powerful and brief current pulse is transmitted to the whole seam, the electrodes being only parted after the supply of current to them has ceased.

The process can, therefore, also be operated approximately in the manner that one or more movable electrodes are pressed by rotary or rectilinear motion against a corresponding number of fixed or stationary electrodes, with sufficient contact pressure and with interposition of the seam to be welded; the current supply being applied, after the requisite contact pressure has been established, directly or indirectly, suitably depending on a contact pressure or an interpolated spring load. Obviously, the opposing electrode or electrodes can be moved in the direction of the other electrode or group of electrodes. It is furthermore advisable to rotate the pair of electrodes through a certain angle, after each welding cycle. The next sheet-metal ring to be welded can be introduced simultaneously with, before or after the completion of a finished, welded body, e. g. a can body, and bent into the required shape by any known form of bending device. It is further advantageous to maintain the electrodes at a suitably low temperature, whether by the provision of exceptionally large contact surfaces, or by the use of suitable means of cooling.

The invention further more depends on the application of the principle that in spot, seam or butt welding of sheet metal, i. e. of metal sheets coated with a second metal, e. g. tinplate, or metals without coating of a second metal but with a low transitional resistance, such as nickel or silver sheets, it is important to restrict the heating of the metal to the region of the seam, e. g. of the lap or butt joint.

This is obtained in accordance with the invention in that, particularly when welding coated sheet metal, a region of concentrated application of heat is deliberately created in the so-called "core region" of the two sheets to be united by spot, seam or butt welding, of such temperature that the metal sheets become welded together, while the temperature at or on the external surfaces of the sheets or the so-called "marginal regions" is maintained so low that the coatings of a second metal, e. g. tin, on the external surfaces of the sheets in such "marginal regions" are effectively maintained.

An essential feature of the process is particularly that further in pursuance of the principle of the invention the transitional and/or contact resistance at the junction point of the sheets (core region) is considerably greater than at the points of application of the electrodes (marginal regions).

It is thus attained that the energy introduced by the welding current is wholly or essentially transformed into heat only in a particular region and does not lead to the undesirable heating of marginal zones, e. g. at the points of contact of the electrodes. This considerably facilitates the welding of sheets coated with a second metal, e. g. tinplates, having a lower melting point than that of the parent metal on which it is applied, and reliably ensures preservation of the second metal coating without the occurrence of any undesirable, concomitant phenomena. This notwithstanding, the efficacy of welding is also improved in that the ratio of the energy consumed at the welding point to the heating effect lost in the leads, etc. is rendered more favourable by the proposed dimensioning of the resistance.

The basic principle of the present invention in particular the creation of a concentrated heating zone can be realized in the manner that such parts of the sheets to be welded and/or electrodes as require to be only moderately heated (marginal regions) are given the lowest possible contact resistance, e. g. by tinning or silvering the corresponding surface. Within the lap or butt joint, on the other hand, the transitional resistance is artificially increased, to the extent that the metal itself has not already a higher transitional resistance than the surface coatings of lower resistance at the points of contact of the electrodes with the parent metal surfaces.

If it is required to weld sheet metal with a lower contact resistance, such as tin plate, nickel sheet, silvered sheet, etc., it is possible according to the invention to increase such transitional resistance by mechanical means, the highly-conducting surface of the sheet metal within the lap itself (core region), but not at the points of application of the electrodes (marginal regions) being modified by roughening, punching, flanging, scraping or grinding, or otherwise removing surface coatings of low transitional resistance, e. g. the tin coating of tin plates and transformed into areas of high transitional resistance. The particular mechanism of resistance involved, i. e. whether so-called strictional resistance factors play a part or whether after removal of the tin coating the less-favourable surface characteristics of the foundation metal are determinant, will depend on the circumstances of the particular case.

According to the invention it is further possible to obtain a concentrated heating zone in the welding of sheet metal having a high transitional resistance, in the manner that the surface of the metal at the points of application of the electrodes (marginal region) is freed from extraneous coatings increasing the resistance, e. g. oxides or other films; or is coated with substances of lower transitional resistance, e. g. by silvering or tinning, while the inner surfaces of the sheets at the overlaps, butts, etc. (core region) are allowed to retain their resistance-augmenting coatings.

Further in accordance with the invention the required high transitional resistance at the overlap or butt joint can also be obtained by the application of surface coatings of high transitional or contact resistance, in particular oxide coatings, semi-conductor coatings, lacquer films, of greater or lesser conductivity, coatings of metallic powders of suitable grain size, etc.

In the case of sheets having a low transitional resistance, e. g. tin plates it is possible according to the invention to provide a strip of the width of the weld seam, corresponding to the overlap of butt joint, which shall be free from the surface coating (extraneous film), e. g. tin, in such manner that in the transition region (core region), the greater transitional resistance of the parent metal becomes effective. The surface of the sheets must of course retain the tin, etc. coating at the places where the electrodes are applied (marginal region). Instead of oxide coatings, semi-conductor coatings or metal powder coatings, the latter suitably applied to the metal with an appropriate, quick-drying or volatile binding medium, the invention further contemplates the use of thin foils or thin wires of a suitable electrical resistance, applied as an intermediate layer in the region of the overlap (core region).

The resistance necessary for setting up a concentrated heating region (core region) can according to the invention be a strictional resistance produced by flanging or folding the sheets at the overlap (core region) or by beading the edges. On the raised parts of the beads, furthermore, the less-resistant, metallic coating may be removed by abrasion for the purpose of increasing the contact resistance at this point.

Since surface coatings on metals, e. g. tin plating or the like, have the further object of preventing corrosion, the contents, e. g. of canning containers must not in the welding of such containers be allowed to come in contact with the foundation metal, e. g. iron, of such containers. For this it is necessary that, firstly, the surfaces of the sheets in the points of application of the electrodes (marginal regions) shall remain intact; and further that in the regions where the plates overlap (core regions), the pure foundation metal is not exposed. For this purpose the invention essentially proposes the provision of the following means, capable of being applied individually or in conjunction, viz.:

1. In the welding of metals coated with other (second) metals, e. g. tinplate, the intermediate layers or films necessary to increase the resistance shall be of no greater thickness than will enable them when softened by the welding process, to merge completely with the coating metal.

2. The intermediate layers or coatings provided in the welding zone (core region) for the purpose of increasing the (electrical) resistance there, should not extend over the full width of the overlap, it being necessary to leave bare, small strips at the edges, in such manner that in these, e. g. tin is in contact with tin, which fuse together, and provide a complete seal in the weld seam.

3. The heat distribution in the overlap is of such nature that fusion or welding only takes place in the central zone, while towards the edges the temperature decreases to such an extent that there, as in the case of tinplate, suitably with the interposition of tin strips or merely by means of the tin coating already present, the two surfaces become soldered together.

4. In the overlaps, strips may be interposed between the outer sheets to be welded together, consisting in the middle of metals having a higher transitional or contact resistance, and at the edges of soldering metal, e. g. tin.

5. In order that the welding process may proceed without disturbance and without unfavourably affecting the metal grain structure produced, as well as if necessary to facilitate the process of soldering, the invention provides that, in conjunction with the measures for producing an increased transitional or contact resistance or independently thereof, substances shall be introduced into the weld seam which shall promote the processes of welding and/or soldering. These are, in particular, fluxes or other substances which by the heat generated by the passage of an electric current, are capable of generating a deoxydizing or protectively inert gas. All such means can be supplementarily introduced into the weld seam (core region) being either applied to the sheet metal to be welded in the form of a paste, or supplied to the weld seam in the form of a gas; or they can alternatively be incorporated in the coating already applied for the purpose of increasing the transitional or contact resistance.

The means for performing the process as described above prevent the foundation metal from being exposed on the overlapping surfaces (core region) in direct contact and coming in contact with the contents of the vessel or the atmosphere. In order, however, that the surfaces of the sheet metal in direct contact with the electrodes (marginal region) shall not experience undesirable modification by the passage of the current and accompanying heating effect, for instance a softening of the tin coating in tinplate, the invention provides that in addition to the measures already described such as lowering the transitional resistance of the sheet metal by tinning, silvering, cooling and/or rotation of the electrodes, the shape of the electrodes shall be such that, in contradistinction to known, electric welding methods, the current densities in the areas of contact between the electrodes and the sheet metal (marginal region) are low; this being attained in the manner that the shape of the electrode is as closely as possible adapted to the shape of the object to be welded, care being taken in such adaptation to ensure that the current predominantly flows through the overlap and does not form leaks or shunts in the adjacent metal.

The importance of short duration of the welding current pulse has already been indicated. If the timing of the current pulses is increasingly accelerated, as may be useful or advantageous for the progress of the welding, the proportion of higher frequencies in each current pulse, will likewise increase. As a consequence, displacement of the current paths in the sense of formation of a larger loop is increasingly probable. In the case of a weld seam of considerable area this may have the effect that the current density through the weld cross-section becomes irregular and the quality of the weld is not everywhere the same: for instance, a weld seam made with a single current pulse may be too thick at one end, good in the middle, and too thin at the other end. While in spot welds such irregularities cannot develop, these will be increasingly apparent as the length of the weld seam, or the diameter or the total extent of the weld, increase. This applies in particular for welds made by a single current pulse. In welds made by a series of successive spot welds, the irregularity due to such displacement of the current lines or skin effect, is unimportant.

In the realization that the unfavourable action of skin effect can be compensated by structural modifications in such manner that a uniform current density distribution can be obtained over the whole weld area, the invention comprises also a novel electrode arrangement, explained later herein.

The essential feature of the invention, i. e. the formation of a "concentrated heating zone" (core region) is applicable with equal advantage to other known welding methods, e. g. with welding rollers or the like.

Various other objects and advantages of the invention will become apparent upon reading the following specification together with the accompanying drawing forming a part hereof.

Referring to the drawing:

Figure 3 is an enlarged sectional view illustrating a welding electrode.

Figure 4 is a schematic circuit diagram of a source of welding current.

Figure 5 is a schematic circuit diagram of another source of welding current.

Figure 6 is a graph illustrating the operation of Fig. 5.

Figure 1:
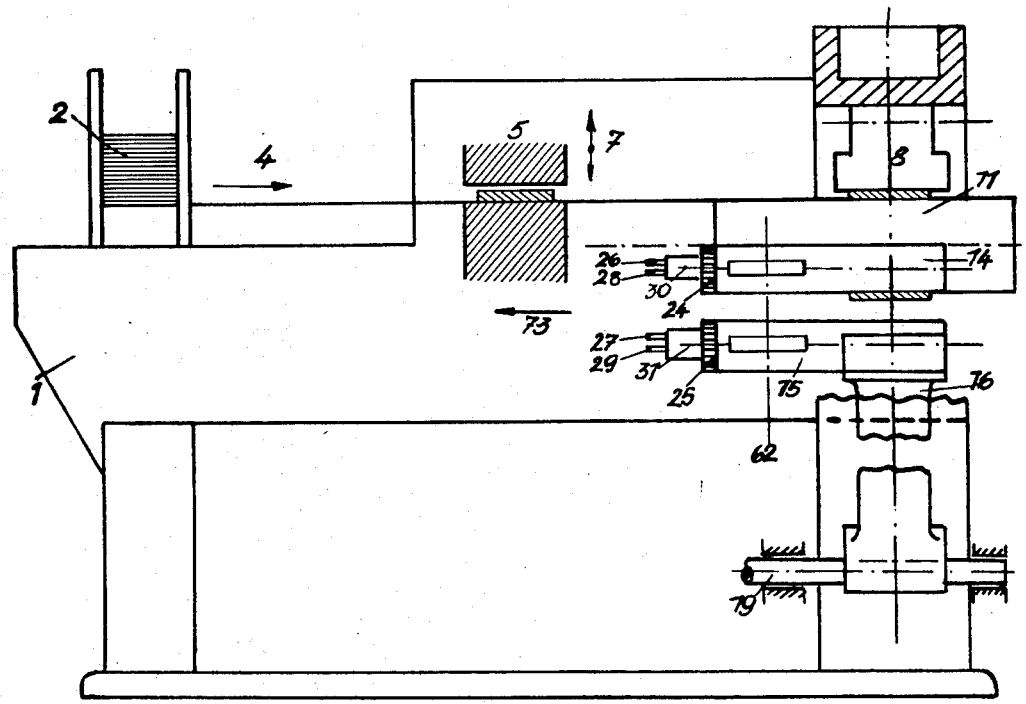
Figure 1 is a diagrammatic elevational view, partly in section, showing an embodiment of the invention.
Figure 2:
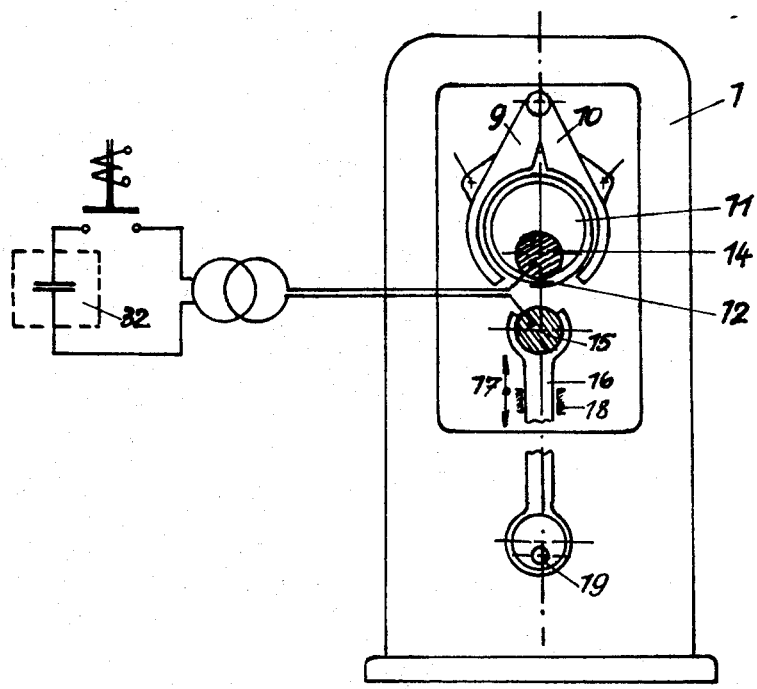
Figure 2 is a transverse sectional view in elevation of the embodiment shown in Fig. 1.

With reference more particularly to Figs. 1 and 2 of the drawings, the arrangement therein illustrated for serial manufacture e. g. of canning container bodies of black or terne plate or tinplate is essentially of similar construction to the known, high-duty beading machines ("body makers") used for making the longitudinal beads of sheet metal containers, e. g. canning containers; except that instead of mechanical means of beading, the new elements for performing welding by means of brief current pulses of high intensity, are incorporated. The device built into the frame or housing 1 comprises a feed hopper 2 containing the sheet metal blanks, which for the production of can bodies are of the usual, oblong and rectangular form. A suitable feeder element withdraws a single blank 2 from the hopper and conveys it in the direction of the arrow 4 to the first station 5 where the flat blank is bent in known manner into a shape with slightly curved ends. This bending in the first station 5 is effected by a stamp moving up and down in the direction of the arrows 7. At each stroke of the stamp, one blank is correspondingly shaped. From the first station 5 the pre-shaped blanks 2 are carried by the conveyor to the welding station 8 and there bent by the jaws 9 and 10 (Fig. 2) around a mandrel 11 into a body 12 with an overlapping joint. In bending the body 12 the jaw 9 acts somewhat before the jaw 10 in order that the two ends of the blank shall not interfere with each other during overlapping. The mandrel 11 contains an electrode 14 arranged eccentrically in such manner as to project somewhat from the mandrel 11 opposite the position of the overlap in the body 12. The counter electrode 15 is held in the ram 16. The body 12 is firmly compressed between the two electrodes 14 and 15 by an upward stroke of the ram 16 in the direction of the arrow 17; this being attained in the manner that the ram, working in guides 18, is actuated by an eccentric on the shaft 19.

In order to obtain a sufficiently low contact resistance in the overlap and avoid sparking, the lapped seam is pressed before welding together with sufficient force by the electrodes, the length of which must correspond to the length of the weld seam, the necessary pressure being constantly or variably applied by suitable spring elements. For this purpose, the ram is made in two pieces, as shown in Fig. 3, consisting of a barrel 20 and a rod 21. The rod 21 is actuated similarly to the ram 16 by an eccentric on the shaft 19 and works inside the barrel 20 which is movable upwards or downwards in the guides 18. The upward motion is transmitted by the rod 21 to the barrel 20 by an internal spring 22, the stroke of which can be adjusted by a screwed distance plate 23, by which means the force with which the electrode 15 is pressed against the electrode 14, and the overlap is closed, can be varied. On the downward stroke, the barrel 20 with the electrode 15 is drawn down by means of a follower or dog plate.

The current pulse is only released after the correct clamping pressure has been attained. The timing can suitably be effected in accordance with the angular displacement of the driving shaft 19, which is indirectly a measure of the deflection of the spring 22.

The electrodes 14, 15 are drawn apart again, only after the current pulse has faded, to prevent sparking due to interruption of the current. This is attained in the manner that the time interval during which the minimum required clamping pressure is maintained between the upstroke and the downstroke, is made equal to the duration of the current pulse.

To prevent unilateral loading of the electrodes 14 and 15, both the electrodes are turned after each welding stroke through a suitable angle. For this purpose, the electrodes 14 and 15 are rotatably fitted in their corresponding holders 11 and 16. The rotation of the electrodes can be performed by gear wheels 24 and 25 (see Fig. 1) actuated by the driving shaft 19 in such manner that rotation takes place only when the electrodes have moved apart.

Particularly in the welding of sheet metal with a coating of a second metal of lower melting point, e. g. tinplate, it is essential that the temperature at the surface of the sheet shall remain below the fusion temperature of the coating. The surface temperature of the sheet metal should not rise too high, also, as in the case of black plates, in order to prevent the formation of scale. The electrodes are consequently so designed that, e. g. by the provision of large contact surfaces or other suitable means, a state of equilibrium is obtained between the heat introduced and the heat abstracted, at a suitably low temperature. Furthermore, a separate cooling medium can be employed, such as a compressed air jet or water cooling of the electrodes. Satisfactory water feed at the points 26, 27 and corresponding water discharge at the points 28, 29, to and from the rotatable electrodes can be obtained by the provision of suitable seals at the transition points 30, 31, between the stationary holders and the rotating electrodes, in the form of a conventional sealing or otherwise (see Fig. 1).

The current supply 32 (Fig. 2) providing the brief current pulse, must be of ample size, and allow of short-period current surges; this is ensured by the provision of a condenser. Any other suitable source of current can be used, however, provided it enables short-period current surges of high instantaneous values to be obtained. For instance, the current can be obtained from an alternating-current network, an impulse of suitable duration being taken from an A.-C. half-wave by means of suitable discharge gap. Since this is not possible by usual means, additional means being provided for intentional premature completion of the pulse. An arrangement for this purpose is shown in Fig. 4. The A.-C. source 33, e. g. a transformer, or a direct network connection, feeds with suitable timing, through the corresponding grid control of the discharge gap, to the consumer circuit 35. Since in discharge gap appliances (thyratron, mercury vapour rectifier) the current ceases only after passing through the null point and cannot be interrupted earlier by grid control, at the appropriate instant the positive plate or coating of the condenser 36 is connetced to the consumer circuit through the auxiliary discharge gap 37, in such manner that an opposite commutation current is caused to flow through the discharge gap 34, and forces the passage through the null point. In the next current interval the device 38 recharges the condenser 36.

A special charging device 38 is, however, unnecessary by the circuit shown in Fig. 5. This circuit works as follows: The discharge gap 40 (Fig. 5) is fired at the time instant 39 (Fig. 6). It is further assumed, that the plate terminal 42 of condenser 41 is positive in relation to plate terminal 43. In the ordinary course the potential source 44 will impel a current through the discharge gap 40 and the receiver circuit 45, maintained until natural passage through the null point, i. e. in a pure energy receiver, until null passage 72 of the secondary voltage 46 of the transformer 44. If the termination of the current is required at the instant 47, however, the auxiliary discharge path 48 is activated with the terminal 42 of the condenser 41 positive, and the cathode potential 49 of the discharge path 40 is thus raised from the value 51 to the value 50 (Figure 6), so that the path 40 is quenched.

Figure 7:
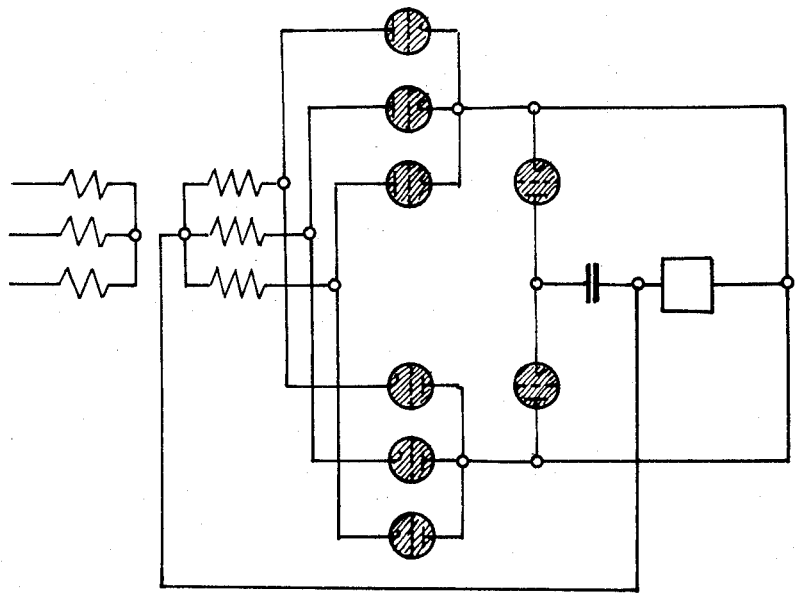
Figure 7 is a schematic circuit diagram of a source of welding current energized from a three-phase power supply.

When a strong inductive consumer load 45 is accepted potential 49 sinks to 43 from 50 in the form of a half oscillation up to potential 56. Where in each half wave the alternating tension is to be welded, the duration of the half oscillation is synchronised in such a way that it is smaller than the time between 47 and 53, at the highest, equal to it. If it is required to have a smaller number of welding impulses than corresponds to double the line frequency, the half oscillation can naturally last correspondingly longer, so that the next welding takes place later on in a complete multiple of the period duration of the alternative tension. After the half oscillation the auxiliary discharge area 48 goes out. Condenser 41 keeps temporarily its negative potential 56. At instant 53 and by a definite number of periods later discharge area 55 is ignited and in instant 58 again compulsorily put out, in effect because the auxiliary discharge area 59 is ignited, as a consequence of which the anode of discharge area 55 is brought down from potential 57 to condenser potential 60 and becomes therefore more negative than the cathode of 55. The potential of the left side of condenser 41 climbs now from the negative value 60 again in a half oscillation 61 to a positive value at the same height as point 50 a period before. The left side of condenser 41 has therefore a positive potential, if in the positive half wave of the alternating tension the discharge area 40 is put out, and it has a negative potential if in the negative half wave of the alternating tension the discharge area 55 is put out etc. The condenser is therefore always discharged in the right manner. The losses of electric load must of course be compensated. For this purpose, an equal tension can be inserted between point 42 in Figure 5 and the anode of tube 48 and the cathode of 59, so arranged that the anode of tube 48 is at plus, the cathode of 59 at minus and the left side 42 of the condenser 41 at the middle potential. Forced commutation is already an essentially known feature of current converters with variable power factor, in another application. For every object to be welded, only one impulse is necessary, as already described. The release of the impulse is obtained by the coordination of the grid control of the discharge area 40, 55 with the motion of the electrodes. As however in practice a number of objects to be welded of for instance 5 per second is aimed at, a welding does not take place in each half oscillation of the alternating tension, but for instance in each twentieth half oscillation with an alternative tension of 50 periods per second. The motion of the electrodes by means of the eccentric control takes place relatively slowly in relation to the frequency of the alternating tension. Therefore, the discharge areas 40 and 55 are ignited alternately, not with a time distance of only one half wave, but for instance with 19 or 21 half waves, so that the welding in a positive half wave is followed by the welding in a negative half wave, situated 19 or 21 half waves further on. The ignition of the discharge areas 40, 55 is prepared for this by the mechanical motion of the push rod 16 and determined exactly in the instant by a corresponding electron valve control. A circuit corresponding to Fig. 5, but for three-phase current, is shown by Fig. 7.

In order to obtain an upper limit for the condenser size in circuit arrangements according to Fig. 2, the condenser is only made large enough to ensure that in consideration of the circuit inductances the discharge oscillation will not last longer than necessary for the required welding pulse. Further, the charging potential of the condenser is made sufficiently high for the accumulated energy to be in proper relationship to the dimensions of the weld seam.

To protect the electrodes from excessively high temperatures and restrict heat reflux from the centre of the weld to the surface of the metal and the electrodes, the welding times are still further shortened by using particularly low-leak transformers as well as keeping the leads from the transformers to the electrodes as short as possible and placing them closely together, in such manner as to obtain a very low inductance in the leads. In addition, the leads are connected to the same side of the electrode.

To avoid harmful inductances by the formation of loops the leads are made fairly rigid, e. g. by use of solid conductor bars instead of the strips usual in welding transformers. In order, however, to avoid the necessity for flexible strands or strips in the connections of the conductor bars, in which looping is practically unavoidable, the feeder bars are movably linked to the electrodes only so long as the latter are in fact required to be in motion, being then rigidly connected in some suitably conducting manner before current is passed to the electrodes.

Figure 8:
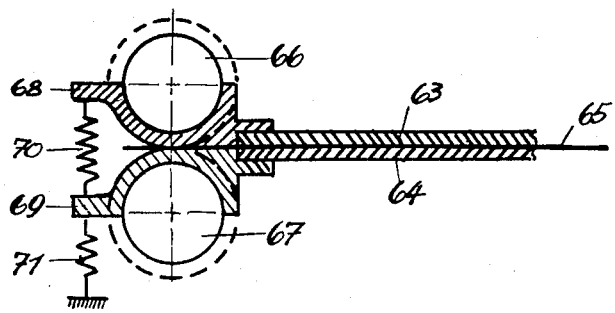
Figure 8 is an enlarged sectional view taken along the line 62 of Fig. 1.

Fig. 8 shows such an arrangement in cross-section through 62 of Fig. 1. The lead bars 63 and 64 extend at a minimum distance apart and are only separated from one another by a laminar insulation 65, a semi-circular jaw 68, 69 being rigidly connected to each of them. The jaws 68 and 69 are firmly pressed by springs against the electrodes 66 and 67, which are identical with the electrodes 14 and 15 in Figs. 1 and 2. The jaw 68 is connected with the jaw 69 through the intermediary of a compression spring 70, while the jaw 69 is itself connected with the machine housing by the tension spring 71. Until the electrode 67 starts its upstroke, the spring 71 draws the jaw 69 and hence through the intermediary of the spring 70 also the jaw 68, slightly downwards in such manner that both electrodes are freely movable. When the electrode 67 is moved upwards it presses against the jaw 69 with a force determined by the spring 71 and further exerts through the intermediary of the spring 70, a pressure on the jaw 68, in such manner that the jaw 68 is also pressed with sufficient force against the electrode 66. Owing to appropriate dimensioning of the springs 70 and 71, only small contact resistances exist between the jaws and the electrodes. The loosening between the jaws 68 and 69 and the electrodes 66 and 67, which is required for the downward movement of the electrode 67, is ensured by resilient yielding if the lead bars 63, 64 are of a suitable length. It is always possible, by suitable means, to provide for a sufficiently loose connection between the feeder bars and the electrodes, should that be necessary. It is desirable to obtain the lowest possible contact resistance in all connections on the high-current side between the transformer and the electrodes by silvering the contact surfaces.

The electrodes 14 and 15, or 66 and 67 are insulated from each other, suitably by an insulating lining as at 72 in Fig. 3, as well as by insulated connection of the springs 70 and 71 according to Fig. 8.

If the feeder bars are not perpendicular to the electrode axes as in Fig. 8, but parallel thereto, the arrangement of the holding jaws may be essentially the same, but the feeder bars are now attached axially to the electrode jaws and led in the direction of the arrow 73 (Fig. 1).

Figure 9:
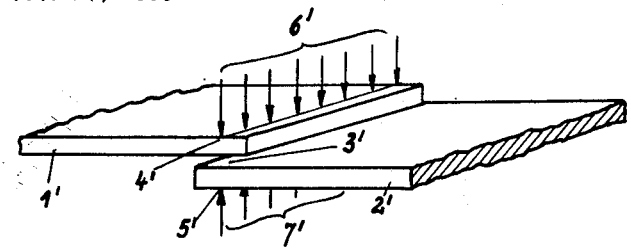
Figure 9 is a fragmentary perspective view illustrating the positioning of certain parts during a welding operation.

According to Fig. 9 it is assumed for example that it is required to weld the sheets 1' and 2' at the lap joint 3'. While in this lap joint 3' between the sheets (core region of the sheets) a development of heat is necessary for the welding process, it is frequently disadvantageous and consequently undesirable, if an excessive temperature rise takes place at the contact points 4' and 5' of the electrodes 6' and 7' (marginal region of the sheets). Particularly in the welding of sheets coated with a second metal such as tinplate suitable means must be employed for ensuring that the metal remains cool at the points 4' and 5' (marginal region). Essentially, this can be attained by using short current pulses, cooling the electrodes 6' and 7', suitably adjusting the compression force acting on them, etc.

These means are however in many cases insufficiently effective in preventing heating or alteration of the metal surface at the points 4' and 5' (marginal region) where the electrodes are applied. It is then necessary deliberately to produce a concentrated heating zone at the lap joint 3' (core region) of Fig. 9.

Figure 10:
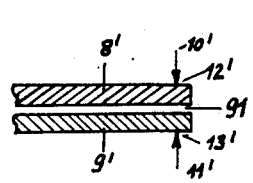
Figures 10 to 14 are enlarged fragmentary sectional views illustrating the positions of various members in the course of welding.

In Fig. 10, 8' and 9' are as in Fig. 9, the two sheets to be welded at the lap joint 91. The current is supplied to the welding point by the electrodes 10' and 11' which are applied to the surface of the sheet at the points 12' and 13' (marginal region). A like arrangement is shown in Fig. 11 where again the sheets 14' and 15' are to be welded at the lap joint 16' by the electrodes 17' and 18' applied at the points 19' and 20' (marginal region). An example of the application of the method to butt welds is represented by Fig. 12 in which the sheet 21' clamped in the jaws 22' of an electrode is pressed at the butt joint 23' against the sheet 24' held in the jaws 25' of a counter-electrode.

Figure 11:
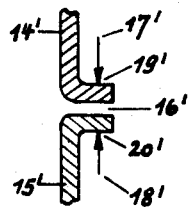
Figure 12:
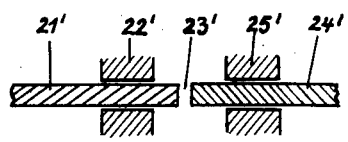
Figure 16:
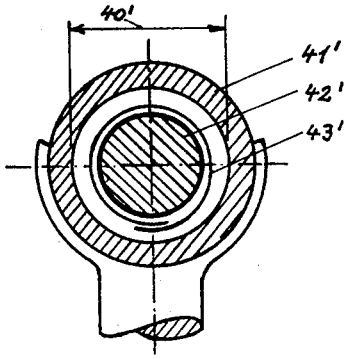
Figure 16 shows another arrangement for forming a lap joint in a cylindrical container.
Figure 23:
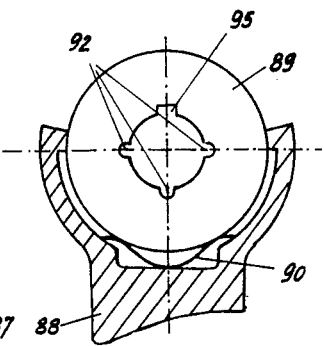
Figure 23 is an end view of the electrode shown in Fig. 22.

It is thus essential that at the points 3' of Fig. 9, or 91 of Fig. 10, or 16' of Fig. 11 or 23' of Fig. 12, the so-called overlaps (core regions) between the sheets in Figs. 9 to 11 or correspondingly the butt joint 23' in Fig. 12, the contact and/or transitional resistance shall be deliberately made considerably greater than the contact resistance at the points of application (marginal region) of the electrodes.

In Fig. 9 the contact resistance at the points of application, 4', 5' of the electrodes 6', 7' (marginal regions) is decreased as far as possible, e. g. by tinning, nickel-plating or silvering the contact faces of the electrodes. Within the lap joint itself, however (core region), between the sheets 1', 2', i. e. at the point 3', the contact resistance is artificially increased.

Figure 13:
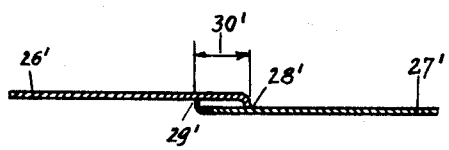

The resistance required for producing a concentrated heating zone in the core region may also be produced as a constriction resistance by flanging the sheet edges 28', 29' in the lap joint (core region) as shown by Fig. 13. The same effect can be obtained by the provision of beads, etc.

Figure 14:
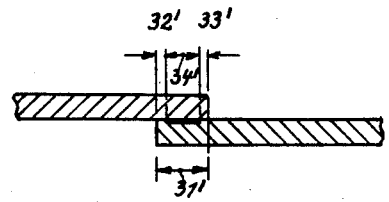

Intermediate strips used to increase the resistance in the core region should not extend over the whole width of the lap, but should leave at the edges, narrow, bare strips 32', 33', as shown in Fig. 14 in such manner that, e. g. with tinplate, there is a tin-to-tin contact, which becomes soldered and thus seals the weld seam at its edges. As shown by Fig. 14 the heat distribution in the lap joint 31' is such that welding takes place only in the central zone 34', while towards the marginal zones 32', 33' the temperature decreases sufficiently to ensure that, e. g. in the case of tinplate and with the suitable interposition of tin strips, the edges of the weld seam are soldered together.

Figure 15:
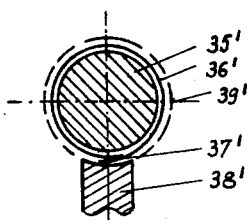
Figure 15 illustrates the formation of a lap joint in a cylindrical container.

In the seam welding of canning container bodies, for instance, the electrode 35' in Fig. 15 is located inside the can body 36', at the lap joint 37'. It must necessarily be made sufficiently convex or rounded at this point in order to fit the curvature of the lap joint 37' properly. The counter-electrode 38' is correspondingly concave to make contact with the can body over a sufficient width. This ensures a large area of contact and consequently a low current density in the contact region of the electrodes. The electrode 38' can alternatively be developed as a concentric, cylindrical ring, corresponding to the broken outline 39', surrounding the electrode 35' and the can body 36'.

By this means a cylindrical, annular electrode 41' is formed which can suitably also be made rotatable. The internal diameter 40' of the annular electrode 41' in Fig. 16 must be sufficiently greater than external diameter of the electrode or electrode holder 42' with the can body 43' surrounding it as well as the possible compression cheeks, not shown in the drawings, that the annular electrode 41' can make a certain stroke in order to achieve the desired compression as well as to afford space for the insertion of the can roll 43', bent at a preceding station, and for the ejection after welding has taken place. The known forms of electrode for spot or seam welding having a sharply conical, sharp-edged or tangentially pointed form are not as advantageous in the sense of the present invention provided the objects to be welded are canning container bodies or similar shapes.

Figure 17:
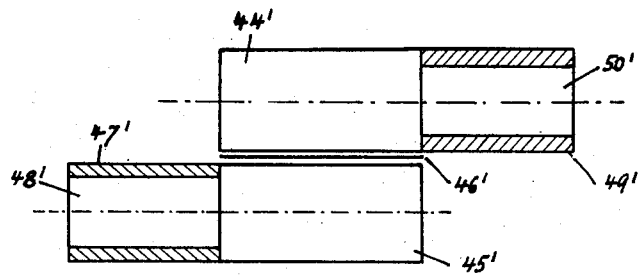
Figure 17 shows an electrode arrangement for seam welding.

The electrode arrangement shown in Fig. 17 enables a uniform current density to be maintained over the whole weld seam. In this arrangement the current supply to the electrodes 44' and 45' between which, e. g., a sheet-metal seam 46' is to be welded by a single current pulse, is equally divided between both sides of the weld. For example, the current feed on the one side to the electrode 45' is effected by a clip or clamp 47' to the lateral electrode stem 48'; on the other side to the electrode 44' by the clip or clamp 49' to the lateral electrode stem 50'.

Figures 18, 19:
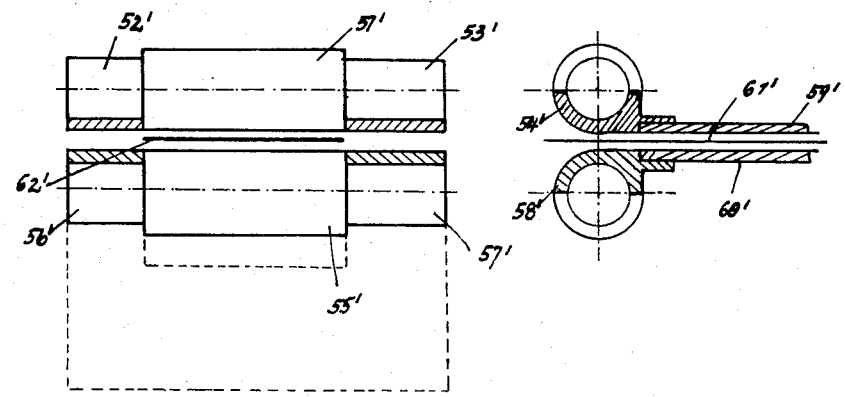
Figure 18 shows another electrode arrangement.
Figure 19 is a fragmentary sectional view showing means for supplying current to welding electrodes.

Another arrangement is shown in Fig. 18. In this case, the current distribution is still further distributed. The electrode 51' receives the current through the two electrode spindles 52' and 53' from double jaws 54', which are shown in section in Fig. 19. The counter-electric 55' is similarly supplied through the two electrode spindles 56' and 57', and the double jaws 58'. The double jaws 54' and 58' are connected to the busbars 59' and 60' in such manner that they can be placed close together and separated only by a thin insulating layer 61'. The air gap apparent in Figs. 18 and 19, between the electrodes 51' and 55' is practically non-existent when the electrodes 51', 55', during the welding process, grip the weld seam 62', e. g. a lap joint between two sheets. The busbars 59' and 60' are forked. The lower busbar 60' of Fig. 19 is indicated by the dotted lines in Fig. 18; in reality, it is turned 90° out of the plane of the drawing, and is shown dotted in Fig. 18 merely to indicate the two-prong connection to the electrode spindles 56' and 57'. The busbar 59' in Fig. 19, supplying current to the spindles 52' and 53' of the upper electrode 51', is similarly forked.

The above arrangements ensure a uniform distribution of the current density through the weld cross-section and hence a uniform weld seam.

Figure 20:
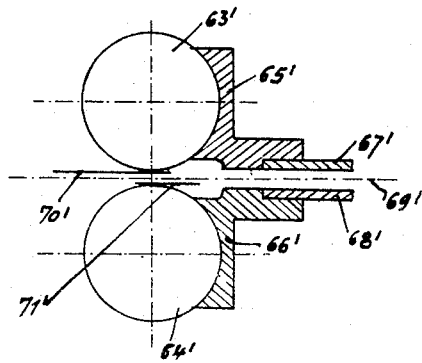
Figure 20 is a fragmentary sectional view showing an electrode arrangement for welding a lap joint in substantially flat sheets.

A simpler arrangement is obtained if no laterally projecting electrode spindles are used, and the current connection is made directly to the electrodes. That is possible, however, only in cases when approximately flat sheets are being welded along a lap joint. The arrangement is shown in Fig. 20. Here, the electrodes 63' and 64' are in direct contact with the jaws 65' and 66', connected to the busbars 67' and 68', an insulating layer 69' being provided between the two latter. The flat sheets 70' and 71' can be directly lap-welded by this arrangement.

Direct current supply to the electrodes is, however, more difficult when the sheets to be welded are of curved or ring shape, e. g. as in Fig. 16, when a can body 43' encircles one of the electrodes 42'.

Figure 21:
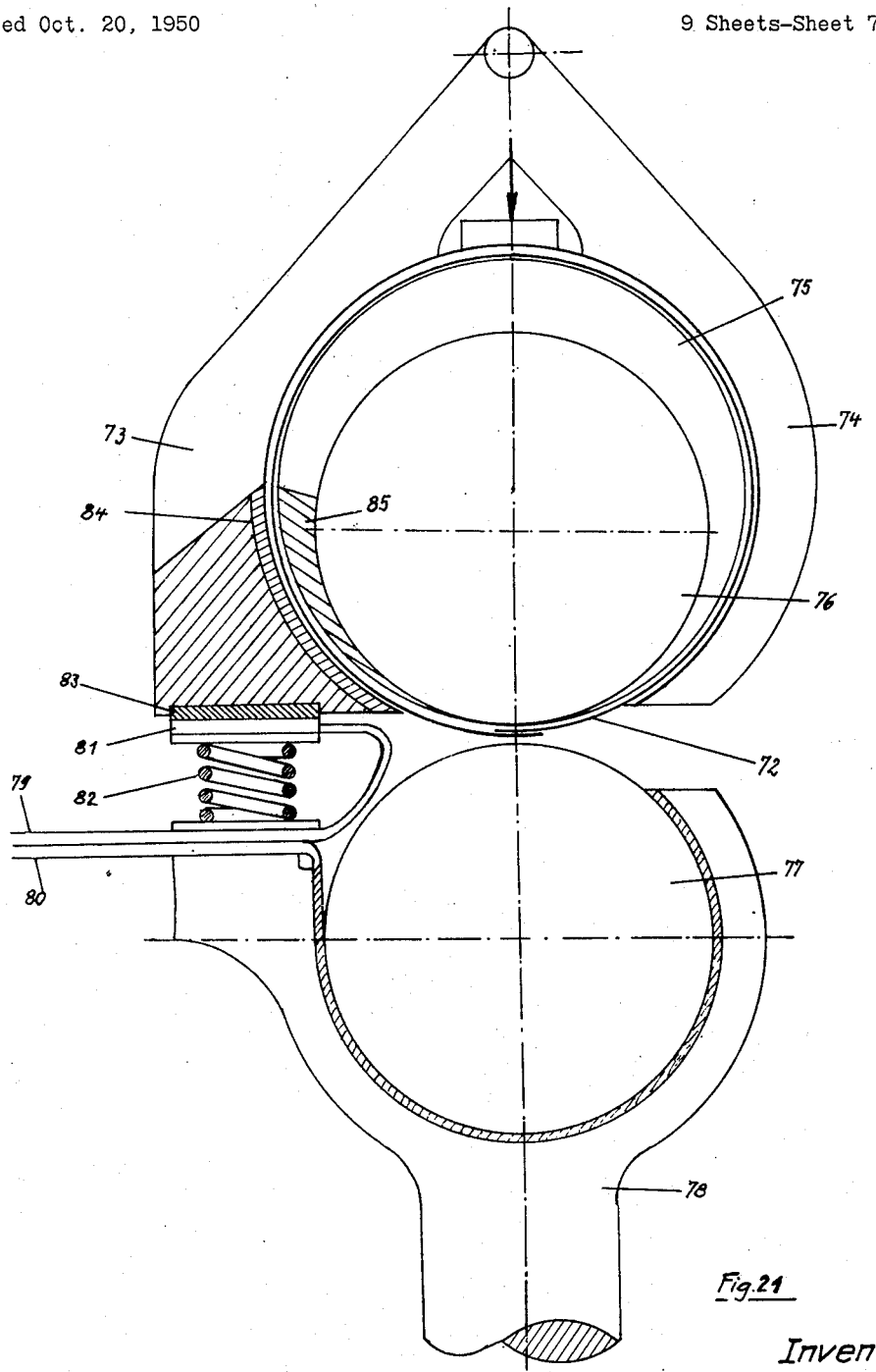
Figure 21 is an enlarged sectional view showing an electrode arrangement for welding a circular can body.

For this case, an arrangement as shown in Fig. 21 is provided. The can body 72 is bent by the jaws 73 and 74 round the mandrel 75 in which is contained the electrode 76. The counter-electrode 77 is held in the grip 78. The current is led through reciprocally-insulated flexible strips 79 and 80, which for very short current pulses are suitably of high-frequency cable, and are placed as closely together as possible, being connected, for instance by suitable braiding with high-strength filaments capable of resisting high electro-dynamic forces. Such strips may suitably be prepared in such manner that besides being placed closely together, the separate wires or strands of both strips are of low inductance type and interwoven in such manner that the conductors separate and are led to separate busbars, only at the end of the cable. The individual strands are of course, suitably insulated. Such conductor cables can advantageously be used for any arrangement of electrodes. The strip 80 makes connection with the lower electrode 77, while the strip 79 is led to a contact plate 81, which is suitably connected to the spring 82 and the grip 78 in such manner that it can follow the reciprocating motion of the grip 78. On the upstroke, i. e. immediately before welding starts, the spring 82 presses the contact plate 81 firmly against the contact plate 83 connected with the jaws 73. The current passes from the contact plate 83 to the electrode 76 through the can body 72 and the mandrel 75. To prevent turning of the can body 72 at the point of passage of the current 84, the area of this contact surface 84 is made very large with reference to the cross-sectional area of the weld. Furthermore, means are introduced into the path of the current to the electrode 76 at transition or contact points, for ensuring low contact resistances: e. g., silvering the faces of the jaws and the mandrel, high area pressures. The contact plate 83 and silvered contact area 84 can be eliminated by making the shaded lower portion of the jaw 73 of some highly-conducting material, e. g. silver. The same can apply to the lower shaded portion of the mandrel 75.

Figure 22:
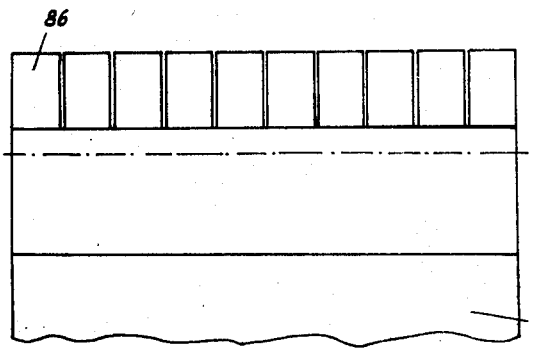
Figure 22 is an elevational view showing an electrode comprising a plurality of individual discs.

In the case of weld seams of considerable length, it is imperative to ensure a uniform current density over the whole length of the weld. In addition to measures introduced in the current supply to suppress displacement effects, as already described, the invention provides for subdivision of one or both electrodes into a number of individual discs 86, as shown in Fig. 22. In this figure, for instance, ten such discs are assembled in a common electrode holder or grip 87. Fig. 23, representing an end view of Fig. 22, shows a section through the electrode grip 88 with a single electrode disc 89. The essential feature is that each of the separate electrode discs, 86, 89, is elastically held, e. g. in Fig. 23 by a leaf spring 90. The action is as follows: If in long welds considerable variations occur in the thickness of the sheets to be welded, the pressing force of the electrode must be increased to the extent that the tolerances are balanced by means of deformation of either the sheet or the electrodes. This, however, leads to high pressures and permanent plastic deformation as soon as the elastic limit of the material is exceeded. Subdivision of the electrode into a number of separately sprung electrode discs ensures that the electrode assembly as a whole, can adapt itself to irregularities of the material. For the purpose of rotating the individual discs simultaneously, if required, a spline 95 is provided, in conjunction with a corresponding key. Furthermore, all individual discs are conductively interconnected by stranded conductors, which are soldered to the separate discs at the points 92. To prevent the springs 90 from gradually embedding themselves in the electrode discs 89, semi-circular ring segments can be interposed between the discs and the springs. The type and arrangement of the springs should be adapted to each individual case.

Figure 25:
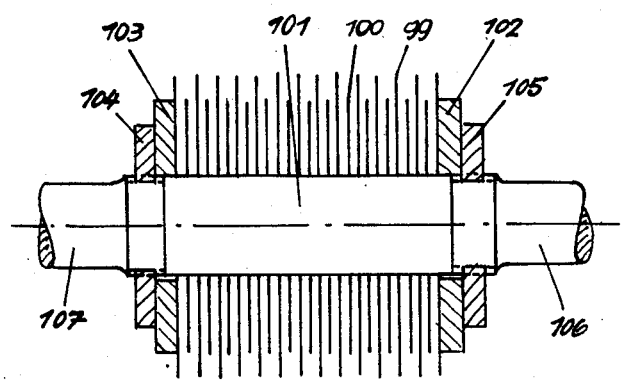
Figure 25 shows a self-adjusting welding electrode.

Another form of an elastically-adaptable electrode, suitably adjusting itself to irregular thickness of the sheets, is shown by Fig. 25. Here the originally cylindrical electrode is broken down into a multiplicity of very thin, plate electrodes 99, mutually separated by thin spacing washers 100 of lesser diameter than the plate electrodes 99. The gap between the electrode discs 99 and the spacing washers 100, visible in Fig. 25, is in reality absent, the discs being threaded on a mandrel 101 and firmly pressed together between end plates 102, 103, by means of nuts 104, 105. The electrode is held in a suitable grip by the ends 106, 107 of the mandrel 101 projecting from the disc assembly. All arrangements previously described, e. g. reciprocating and rotary motion, can be used with this type of electrode. Similarly, the current supply to such electrodes can be effected in the manner already described, through the ends 106, 107 of the mandrel 101. Contrary to the arrangement in Fig. 22, in which each electrode disc is individually sprung, the discs 99 in Fig. 25 are so adjusted in thickness, material and ratio of their diameter to that of the spacing washers 100, that when the correct press force is attained on the upstroke of the electrode, they are able to deflect axially in some degree and thus easily adapt themselves to irregularities in the thickness of the sheets to be welded, thus assuring uniform current density distribution over the whole length of the weld seam. The material of which the discs 99 are made, must have the known, favourable electrode characteristics of low wear and small contact resistance and further be elastic in the manner indicated above. Thus, for example, high nickel spring steels may be selected, or other, suitable spring material, e. g. with silvered or nickel-plated surface. The spacing washers 100 are made as thin as possible to prevent any appreciable interruption of the welding seam.

Figures 26, 27:
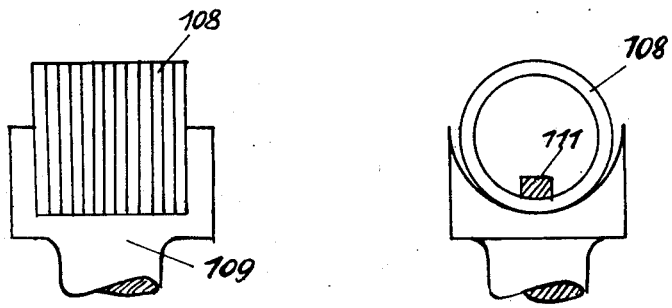
Figure 26 shows still another self-adjusting welding electrode.
Figure 27 is an end view of the electrode shown in Fig. 26.

A further type of elastically adaptable electrode is shown in Fig. 26, and in end view, in Fig. 27. In this, rings 108 are ranged next to one another and built into the electrode holder 109. The end elevation Fig. 27, shows that the semi-circular recess of the electrode grip is of greater diameter than the rings 108 in Figs. 26 and 27. The rings and electrode holder are firmly connected by the locking strip 111. Owing to the differing diameter of the rings 108 and the electrode holder or grip, the rings 108 are enabled to give way slightly when pressed against the weld seam, so that the electrode assembly composed of such individual rings, can adapt itself to variations in the thickness of the sheets to be welded.

In cases where the variation in thickness of the sheets to be welded, is relatively small, electrodes can be used in which the possibility of plastic deformation is assured by suitable formation of the surface. In particular, the electrode can be provided with fine, axial grooves, or such grooves may be arranged spirally, or be radially circular. In these cases, a generally cylindrical electrode shape is necessary. Depth, width and spacing of the grooves will depend on the material of the electrode and the circumstances of the particular case. In many cases, grooving such as obtained by rough or fine machining will be adequate, since the variations in thickness of the sheets are often within such limits, and can be compensated by plastic deformation of the grooving.

Figure 24:
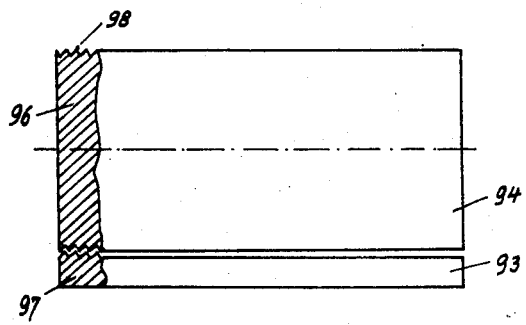
Figure 24 illustrates a tool for reconditioning a welding electrode.

In order to enable plastic deformation of the electrode even after the grooves or ridges have become flattened by repeated welding, such grooves can be cleaned and restored by a suitable tool, 93 in Fig. 24, adjustable for progressive wear or deformation of the electrodes, having the same length as the welding electrode and acting at each revolution of the latter. The shaded areas 96 and 97 of the electrode 94 and of the tool 93, show on an enlarged scale, the grooving 98, which is shown only for the shaded area, and obviously extends over the whole length of the electrode and the tool. It is advisable that with progressive wear of the electrodes the correct pressure should be automatically adjusted, e. g. in relation to the increase in the length of travel.

The density of the weld seam increases with decreasing width and spacing of the grooves or ridges. If high density of the weld is not required, spiral grooving of a harder electrode will be suitable, a plastically deformable wire being introduced into such groove and fed forward during rotation of the electrode. The same can be done in the case of axial grooving.

The invention further provides that in case the sheets to be welded are not excessively hard, it is possible to use electrodes of harder material than the sheets to be welded, provided with small grooves or ridges. By this means, any irregularities in the thickness of the sheets to be welded, can be compensated by corresponding deformation of the said sheets; while the electrodes are unaffected.

It is further possible to use bimetallic electrodes, e. g. of tungsten-silver, ensuring adequate hardness with sufficient conductivity and low contact resistance.

I claim:

1. An electric resistance welding process for the continuous manufacture of overlapping longitudinal seams in metal packings and metal containers of any type made of material selected from the class consisting of ordinary metals, such as sheet metal, and metals coated with a different metal, such as tin plate, which comprises pressing together the overlapping parts of the seam to be welded throughout the entire length of the weld solely by means of a pair of electrodes at a sufficiently high surface pressure, one of said pair of electrodes being disposed above and the other beneath said overlapping parts, causing a single brief current pulse which is sufficiently strong to weld the seam to pass through the seam throughout the whole of its length only after the desired pressure has been applied to said overlapping parts, separating said electrodes from each other only after the current supply to the electrodes has been completed, and rotating the electrodes through a certain angle after each welding stroke.

2. An electric resistance welding process for the continuous manufacture of overlapping longitudinal seams in metal packings and metal containers of any type made of metal coated with a different metal, such as tin plate, which comprises pressing together the overlapping parts of the seam to be welded throughout the entire length of the weld solely by means of a pair of electrodes at a sufficiently high surface pressure, one of said pair of electrodes being disposed above and the other beneath said overlapping parts, causing a single brief current pulse which is sufficiently strong to weld the seam to pass through the seam throughout the whole of its length only after the desired pressure has been applied to said overlapping parts, creating a concentrated heating zone at the joint face of the parts being welded, that is only in the core region of the joint, of such temperature that the parts are welded together, the temperature at the external surfaces of said parts being maintained sufficiently low to ensure that the second metal coating applied to the external surface of said parts remains fully effective, and separating said electrodes from each other only after the current supply to the electrodes has been completed.

3. Process in accordance with claim 2 characterized in that the electric contact resistance and/or transitional resistance at the joint faces of the sheet metal, namely the core region, is made greater than at the points of application of the electrodes, namely the marginal regions of the sheets.

4. Process in accordance with claim 2 characterized in that the external surfaces of the metal sheets or marginal regions are provided at the points of application of the electrodes with supplementary surface coatings having a low contact resistance suitably by silvering, tinning or the like, and/or that at the internal overlap between the metal sheets or at the butt joint or in the core region the said sheets are by suitable means given a greater contact resistance and/or transitional resistance than present in the marginal regions of the said sheets.

5. Process in accordance with claim 2 characterized in that in the case of metal sheets of inherently low contact resistance such contact resistance at the inner surfaces of the said metal sheets or core region is deliberately increased by mechanical means such as roughening, flanging, scraping or grinding.

6. Process in accordance with claim 2 characterized in that in the case of metal sheets with a relatively high, inherent contact resistance the said contact resistance on the external surfaces of the said sheets at the points of contact of the electrodes is deliberately reduced by suitable means in particular by removing oxide films or other coatings of high contact resistance or by applying surface films or coatings of low contact resistance suitably by tinning, silvering or the like.

7. Process in accordance with claim 2 characterized in that the contact or transitional resistance between the metal sheets in the lap joint or core region is maintained at a specific value by the application either of coatings of higher contact or transitional resistance such as oxide films, semi-conducting coatings, coatings of metal powder, conducting lacquers, or of other conducting or semi-conducting substances.

8. Process in accordance with claim 2 characterized in that for the purpose of obtaining a relatively high contact or transitional resistance one or several intermediate thin layers of metallic or semi-conducting material or wires are provided between the metal sheets in the lap joint.

9. Process in accordance with claim 2 characterized in that the edges of the metal sheets at the lap joint are slightly flanged and/or that beading of the lap joint is employed to produce a strictional resistance opposing the passage of current between the metal sheets.

10. Process in accordance with claim 2 characterized in that in the welding of metal sheets with coatings of a second metal such as tin the thickness of the intermediate layers is not more than the combined thickness of the metal coatings on the two aforesaid metal sheets being welded.

11. Process in accordance with claim 2 characterized in that the electrodes or their surfaces are made of a metal of low contact resistance such as silver or nickel.

12. Process in accordance with claim 2 characterized in that the means for increasing the contact and/or transitional resistance are not applied to the whole width of the lap joint but that narrow strips are left on the edges of the aforesaid lap joint.

13. Process in accordance with claim 2 characterized in that the heat distribution in the region of the lap joint is such that fusion welding only takes place in the central zone of the lap joint while the temperature towards the marginal zones is sufficiently reduced to ensure that in these regions only a soldering of the edges of the lap takes place particularly in the case of tinplate and suitably by the interposition of strips of low-melting metal such as tin.

14. Process in accordance with claim 13 characterized in that strips are interleaved in the lap joint having in the middle a higher contact or transitional resistance than at the two sides and consisting of soldering metal such as tin.

15. Process in accordance with claim 2 characterized in that heating of the electrode contact surfaces on the external surfaces of the metal sheets is avoided by giving the electrodes a form suitable for obtaining low current densities.

16. Circuit essentially in accordance with claim 52 characterized in that for the purpose of generating short pulses directly from alternating-current sources and in order to avoid the necessity for a separate charging element in both half-waves of each phase through two principal discharge gaps in push-pull connection and that a condenser without additional means of charging is caused to produce positive commutation in each half-wave by means of two auxiliary discharge gaps and independently of the phase number.

17. Circuit in accordance with claim 51 in that for the purpose of obtaining shortest possible welding times for each seam low-loss transformers of essentially known type are used.

18. Circuit in accordance with claim 51 characterized in that the conductor loop formed by the electrode feeders is of very small dimensions due to the fact that the feeder leads are arranged as closely as possible and connected to the same side of the electrode.

19. Circuit in accordance with claim 18 characterized in that the feeder leads are of rigid construction to prevent formation of a disadvantageous conductor loop and that the connections of the feeder leads or busbars to the electrodes are only sufficiently flexible to admit of motion of the electrodes or the electrode about the longitudinal axis and/or perpendicularly thereto and that a suitably effective, conducting connection is effected before current is passed to the electrodes.

20. Circuit in accordance with claim 18 characterized in that the connection between the busbars and the electrodes is effected by means of jaws of approximately semi-circular cross-section in such manner that when the electrodes are pressed together, the jaws are firmly pressed against them by springs and that these jaws are moved away from the electrodes in the measure that the latter move apart as well as that the electrodes are capable of motion about their axes as well as perpendicularly thereto.

21. Device in accordance with claim 55 characterized in that the spring is of such dimensions as to cause the time interval between the attainment of the minimum necessary pressure of the electrodes and the subsequent relaxation of such pressure is at least equivalent to the duration of the current pulse.

22. Device in accordance with claim 55 characterized in that the electrodes are rotatably held in their grips and that the electrodes are automatically rotated through a pre-determined angle after each welding stroke or pulse.

23. Device in accordance with claim 22 characterized in that the rotation of both electrodes is effected from the driving shaft suitably by means of gear wheels in such manner that the electrodes are made to rotate only after they have again moved out of contact with each other.

24. Device in accordance with claim 55 rigid current feeders or busbars which are separated by a thin insulating layer and are conducted in closest proximity to each other being ultimately each connected to separate semicircular jaws or grips which are pressed by springs against the electrodes in such manner that a tension spring presses the grip against the movable counter-electrode while the compression spring attached at one end to the grip presses the grip against the fixed or stationary electrode.

25. Device in accordance with claim 24 characterized in that the busbars are parallel or perpendicular to the electrode axis.

26. A device according to claim 55 characterized in that the electrode and the counter-electrode are closely approximated to the shape of the metal sheet to be welded in the manner that they make intimate contact with the external surfaces of the metal sheets over the greatest possible area and for instance the one electrode is suitable convex or rounded while the other electrode is suitable concave or in the form of a concentric, cylindrical and suitably rotatable ring.

27. A device in accordance with claim 26 characterized in that the internal diameter of the cylindrical ring electrode is at least equivalent to the external diameter of the electrode or of the corresponding electrode grip with the surrounding container body in such manner that the ring electrode is free to perform a working stroke.

28. A device in accordance with claim 27 characterized in that the electrode is connected to opposite sides of the welding point.

29. A device in accordance with claim 28 characterized in that the current supply on one side of the electrode is effected by means of a clip or grip leading to the lateral electrode spindle and on the other side by a clip or grip leading to the lateral electrode spindle.

30. A device in accordance with claim 26 characterized in that the current supply to the electrodes is effected to lateral electrode spindles by means of double grips to which the closely-approximated busbars separated only by a thin insulation are connected.

31. A device in accordance with claim 30 characterized in that the busbars have fork-shaped ends.

32. A device in accordance with claim 26 characterized in that the current supply to the metal sheets to be welded is led directly to the electrodes.

33. A device in accordance with claim 26 characterized in that the container body is bent by clamps around a mandrel containing an electrode and that the counter-electrode is fitted in a holder.

34. A device in accordance with claim 33 characterized in that the current supply to the electrodes is effected by means of reciprocally insulated flexible strips in such manner that the strip is directly connected to the electrode while the connection of the strip with the electrode is effected through the intermediary of the contact plate connected with a spring and a holder in such manner that the contact plate follows the reciprocating motion of the holder.

35. A device in accordance with claim 34 characterized in that the flexible strips are composed of individual insulated wires of a low-inductance type united to form such strips.

36. A device in accordance with claim 34 characterized in that the current transmission point is of large surface area compared with the weld cross-section and that its contact resistance values are as low as possible.

37. A device in accordance with claim 36 characterized in that the lower part of the jaw or grip and the lower part of the mandrel are made of some highly-conducting material such as silver.

38. A device in accordance with claim 26 characterized in that at least one of the electrodes consists of individual thin plates and individual spacing washers of somewhat smaller diameter in such manner that the electrode is enabled to adapt itself to the surface inequalities of the metal sheet by deflection of the individual plates.

39. A device in accordance with claim 26 characterized in that at least one of the electrodes is composed of adjacent separate rings capable of compensating the surface irregularities of the metal sheets to be welded.

40. A device in accordance with claim 26 characterized in that the electrode faces are plastically easily deformable.

41. A device in accordance with claim 40 characterized in that the specifically cylindrical electrodes are provided with axially arranged circumferential grooves of specific dimensions.

42. A device in accordance with claim 40 characterized in that the grooves on the circumference of the electrode are radially arranged in spirals or in closed circles.

43. A device in accordance with claim 41 characterized in that the grooves are continuously restored by a cutting tool during rotation of the electrode.

44. A device in accordance with claim 43 characterized in that the cutting tool is progressively adjustable in accordance with the progressive wear of the electrodes.

45. A device in accordance with claim 26 characterized in that with progressive wear of the electrodes the correct pressure force is regulated automatically, i. e. in accordance with the increased length of stroke.

46. A device in accordance with claim 26 characterized in that the electrodes are made of harder material than the material of the metal sheets to be welded.

47. An electric resistance welding process for the continuous manufacture of overlapping longitudinal seams in metal packings and metal containers of any type made of material selected from the class consisting of ordinary metals, such as sheet metal, and metals coated with a different metal, such as tin plate, which comprises pressing together the overlapping parts of the seam to be welded throughout the entire length of the weld solely by means of a pair of electrodes at a sufficiently high surface pressure, one of said pair of electrodes being disposed above and the other beneath said overlapping parts, causing a single brief current pulse which is sufficiently strong to weld the seam to pass through the seam throughout the whole of its length only after the desired pressure has been applied to said overlapping parts, and separating said electrodes from each other only after the current supply to the electrodes has been completed.

48. A process according to claim 47, characterised in that the current supply between the electrodes takes place only when the relative movement between the electrodes is zero.

49. A process according to claim 47, characterised in that the electrodes are firmly pressed together by means of a reciprocating movement.

50. A process according to claim 47, characterised in that at least one movable electrode is caused to approach at least one stationary electrode.

51. An electric device for carrying out the process according to claim 47, comprising a condenser for generating a brief, strong current discharge, the size of the condenser, taking into consideration the inductances in the current circuit, being such that the discharge vibration lasts at most as long as is necessary for the welding purpose at the time, and the loading voltage of the condenser being at least so high that the accumulated energy of the condenser is adapted to the length of the welding seam.

52. Electric device for carrying out the process according to claim 47, comprising an alternating current supply net-work for the direct feeding of a current pulse, and, in addition, means for effecting a predetermined premature completion of the pulse.

53. An electric device according to claim 52, characterised in that, for generating short current pulses, one current pulse is operated directly from alternating voltage sources in both half-waves of each phase over two main paths of discharge connected in opposite directions, and that a condenser, over two auxiliary paths of discharge and independently of the phase-number, effects a premature completion of the pulse alternatingly in each half-wave in such manner that according to the required number of welding pulses per second, the welding pulse in the other half-wave is not effected after welding until after the required period.

54. A device according to claim 26, characterised in that one or both electrodes are divided into several electrically connected individual discs, each of the individual discs being supported by one or several springs, the individual discs being combined in one common electrode-holder, and the individual discs being at the same time adapted to be rotatable and connected together by means of resilient cable conductors.

55. A device for the continuous manufacture of overlapping longitudinal seams in metal packings and metal containers of any type made of material selected from the class consisting of ordinary metals, such as sheet metal, and metals coated with a different metal, such as tin plate, comprising a mandrel, two circularly curved jaws movable about the mandrel to bend a preshaped metal blank to form a body with a lap joint, an electrode eccentrically arranged within the mandrel so as to project beyond the outer surface of the mandrel at the point corresponing to the position of the lap joint of the body, a counter-electrode located beneath the mandrel, a push-rod for moving the counter-electrode against the electrode at the lap weld, an eccentric driving shaft for said push-rod, and spring means for varying the pressure exerted on the lap joint by said electrodes.

HELMUT KREFT.

References Cited in the file of this patent

UNITED STATES PATENTS

| Number | Name | Date |
|---|---|---|
| 1,190,902 | Hood | July 11, 1916 |
| 1,628,928 | Taylor | May 17, 1927 |
| 2,385,710 | Kershaw | Sept. 25, 1945 |
| 2,391,292 | Brenzinger | Dec. 18, 1945 |
| 2,484,973 | Vang | Oct. 18, 1949 |

FOREIGN PATENTS

| Number | Country | Date |
|---|---|---|
| 122,671 | Australia | Nov. 1, 1946 |